United States Patent [19]

Osterhagen et al.

[11] 4,419,158

[45] Dec. 6, 1983

[54] PROCESS AND APPARATUS FOR THE PRODUCTION OF A PIPE OF FOAM MATERIAL WITH A CLOSURE

[75] Inventors: Gerhard Osterhagen, Eitorf; Siegfried Feige, Siegburg, both of Fed. Rep. of Germany

[73] Assignee: Dynamit Nobel Aktiengesellschaft, Troisdorf, Fed. Rep. of Germany

[21] Appl. No.: 420,879

[22] Filed: Sep. 21, 1982

[30] Foreign Application Priority Data

Oct. 10, 1981 [DE] Fed. Rep. of Germany ....... 3140388

[51] Int. Cl.³ ............................................. B32B 31/00
[52] U.S. Cl. ..................................... 156/66; 156/203; 156/229; 156/466; 156/494
[58] Field of Search ................. 156/461, 466, 203, 66, 156/229, 494, 201

[56] References Cited

U.S. PATENT DOCUMENTS

| | | | |
|---|---|---|---|
| 3,575,769 | 4/1971 | Radyio | 156/466 |
| 3,650,868 | 3/1972 | Murota | 156/466 X |
| 3,853,671 | 12/1974 | Ausnit | 156/66 X |
| 4,372,793 | 2/1983 | Hery | 156/66 |

FOREIGN PATENT DOCUMENTS 2459117  6/1975  Fed. Rep. of Germany ...... 156/203

*Primary Examiner*—David A. Simmons
*Attorney, Agent, or Firm*—Antonelli, Terry & Wands

[57] ABSTRACT

A process for the continuous manufacture of a closable pipe slotted in the longitudinal direction which is made from a sheet of a thermoplastic foam material involves shaping the sheet in the heated thermoelastic and/or thermoplastic state at right angles to its longitudinal direction into a pipe cross section, and applying the strips of a closure, especially a slide fastener of a thermoplastic synthetic resin, to the mutually facing longitudinal edges of the pipe slot by means of welding, heat-sealing, cementing, or the like. The closure strips, prior to being joined to the shaped, still heated foam pipe, are elongated by the effect of tensile force to the same extent as the foam pipe shrinks during cooling after application of the closure to provide a straight pipe or sheath like structure with a closure means.

10 Claims, 4 Drawing Figures

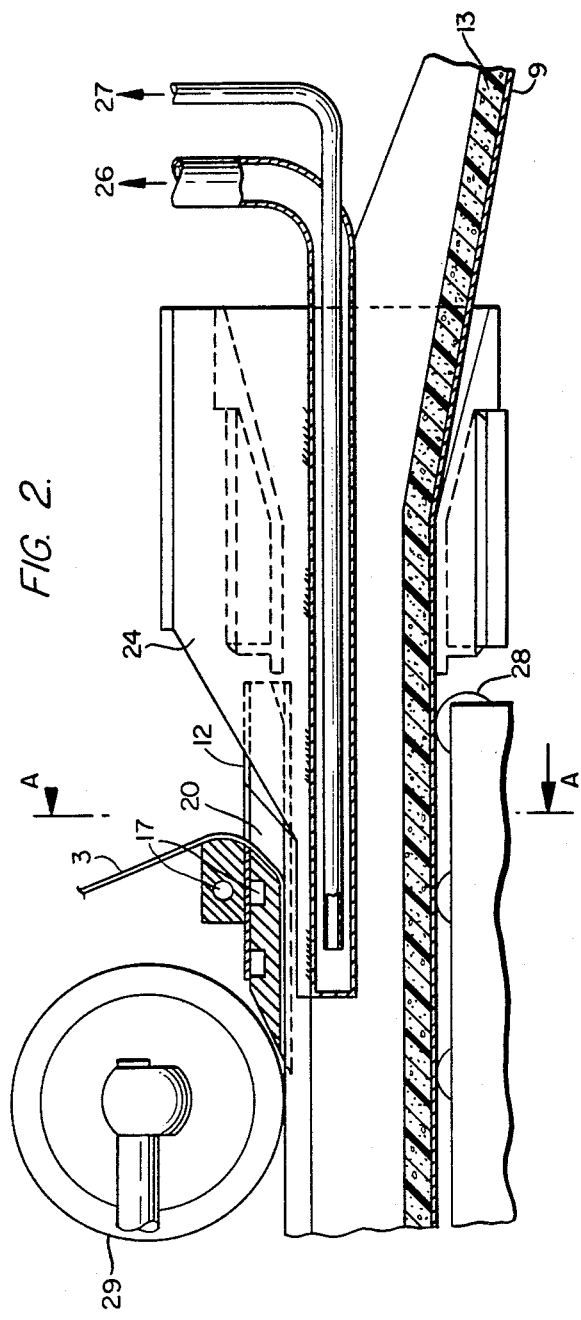
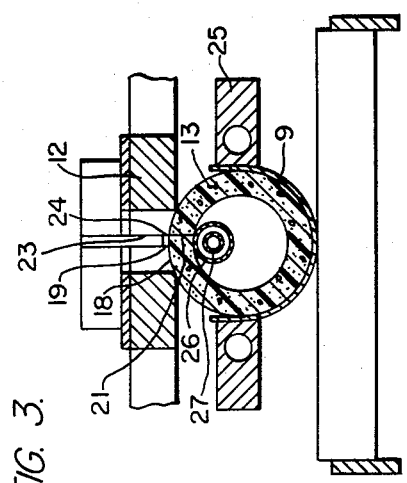

PROCESS AND APPARATUS FOR THE PRODUCTION OF A PIPE OF FOAM MATERIAL WITH A CLOSURE

This invention relates to a process for the manufacture of a pipe that is slotted in the longitudinal direction and/or that is made from a sheet of a thermoplastic foam material by shaping the sheet in the heated thermoelastic and/or thermoplastic state at right angles to its longitudinal direction into a pipe cross section, and by applying strips of a closure, especially a slide fastener of a thermoplastic synthetic resin, to the mutually facing longitudinal edges of the pipe that define a slot by means of welding, heat-sealing, cementing (gluing), or the like. This invention furthermore concerns an apparatus for conducting the process which has a revolving conveyor belt for transporting the continuously fed sheet of foam material, an inlet funnel, a device for closing the slot, and a feeding means for the closure strips.

It is known to produce insulating pipes from foam strips by thermoforming and welding or cementing of joints, see, for example, German Pat. No. 2,532,406 and German Pat. No. 1,915,768. Also, methods have been known for providing pipes manufactured in this way with releasable closures, for example sliding closures, see, for example, DOS (German Unexamined Laid-Open Application) No. 2,509,833 and DAS (German Published Application) No. 2,512,755. Such pipes show advantages when mounted for the subsequent insulation of already installed pipelines, due to a simple assembly.

In the heretofore known processes for the production of insulating pipes with closure systems, a foam pipe as a finished product, closed along its periphery, is, in an additional working step, first slit once more in the longitudinal direction at some location of the periphery, and then the closure strips are applied to the zone beside the separating site, as described, for example, in German Pat. No. 2,532,406.

It has also been suggested to extrude the closure strips directly onto the foam surface, but considerable problems are encountered in this case regarding the manufacture of dimensionally stable, shape-retaining slide fastener strips which are to be hooked together.

The invention is based on the object of improving the conventional processes and apparatus for the production of insulating pipes of foam materials with releasable closures in such a way that the closures are applied as early as during the shaping of the foam sheets into pipes and simultaneously dimensionally accurate, straight pipes are being produced. This procedure eliminates the additional working step of a subsequent slitting of the shaped pipes and application of the closures.

Starting, for example, with a process for pipe manufacture as disclosed in German Pat. No. 2,532,406, the invention proposes to elongate the closure strips by the effect of a tensile force prior to their connection along a longitudinal edge of the shaped, still heated foam pipe, to the same extent as the foam pipe will shrink during cooling after application of the closure, so that the joined closure strips and the foam pipe shrink by the same amount. The process of this invention makes it possible in this way to manufacture straight pipes. It will be understood that foam pipes shrink, after thermoforming, during cooling; this shrinkage being, in part, caused by thermal effects and, in part, stemming from an elongation due to frictional resistances during the transport and shaping steps. By the corresponding stretching of the closure strips as provided for by this invention, the subsequent change in length of the foam pipe is compensated for by the fact that the closure shrinks with it to the same extent. Thus, straight pipes with closures are produced.

Also, this avoids the disadvantage to manufacture first the molded, closed pipe, as in the conventional processes, which pipe after cooling and shrinking is first slit open, and thereafter is provided with closure strips in this slit zone.

According to one embodiment of the invention, the closure strips are elongated by means of a friction wheel brake with an adustable setting spring regulating the tensile force to be applied, before the strips are adhesively bonded to the foam pipe. The degree of elongation depends on the respective foam pipes, i.e. especially on the wall thickness of the foam pipes. The elongation ranges usually between 0.5% and 8%.

Preferably, the closure strips are applied and bonded to the open foam sheet, shaped to the form of a pipe, under exposure to hot air and the pipe is conveyed during this step under cooling along its outside and inside in the zone of the longitudinal edges. The welding on of a closure is suitable, for example, in insulating pipes made of a readily weldable material, such as, for example, polyethylene foams that are crosslinked or no crosslinked, which can be joined directly to polyethylene slide fasteners. Since relatively high welding air temperatures of between 300° and 600° C. are utilized for welding the closure strips to the pipe, the apparatus for guiding the pipe and the foam pipe are heated up; as a consequence, the pipe tends to stick to the apparatus. It is necessary for this reason to strongly cool the apparatus and the guide means for the pipe in the zone of the welding operation to avoid in this way a sticking of the foam pipe.

Starting with conventional apparatus for the manufacture of insulating pipes by molding foam sheets or foam strips, the invention suggests to design the apparatus with a friction wheel brake comprising a braking roller with a friction resistance adjustable by means of a setting spring for elongating the closure strips and with a cooled guide means in contact with the pipe on the pipe inside in the zone of the slot, especially constructed to be a cooling tube and optionally to be adustable, and with a cooled sliding plate with guide groove and inlet opening for the closure strips, resting on the outside of the pipe in the zone of the slot.

Additional embodiments of the apparatus of this invention are hereinafter described.

The invention will be described in greater detail with reference to the accompanying drawings, wherein:

FIG. 2 shows, in a detailed view, the bonding zone of a closure to an insulating pipe in a longitudinal section;

FIG. 3 shows the bonding zone of FIG. 2 along section line A—A in a cross-sectional view; and FIG. 4 shows a detail of a foam pipe provided with a slide fastener.

Figure 1:
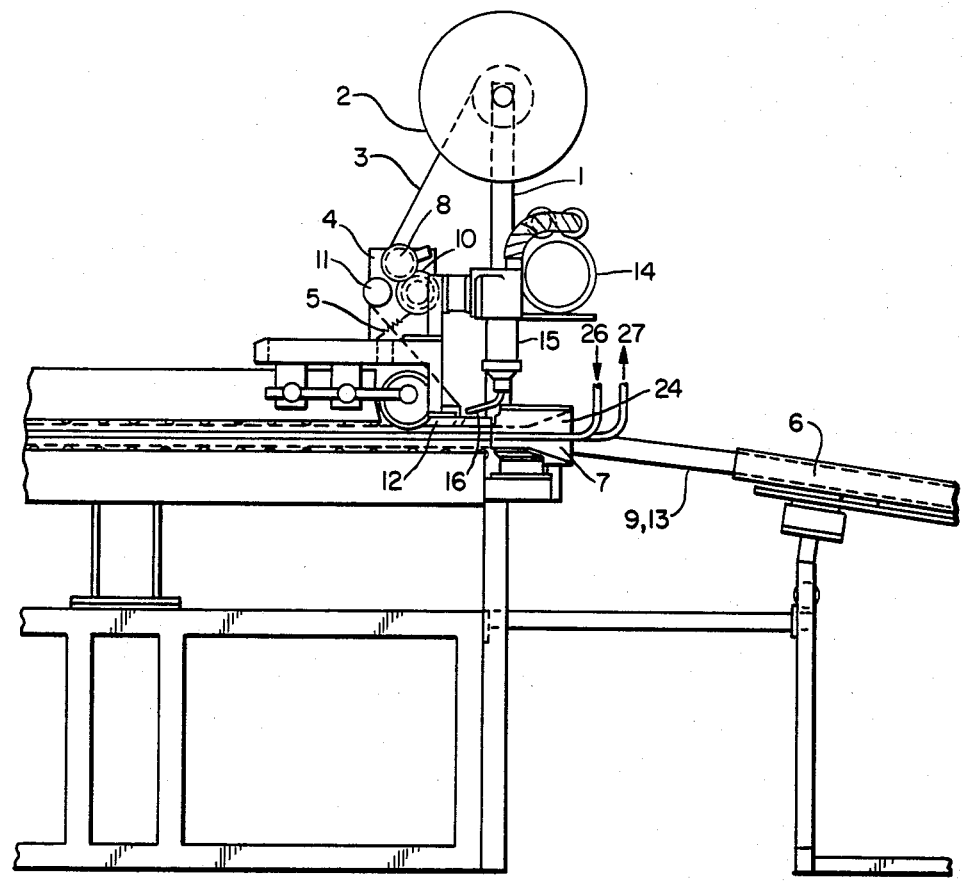
FIG. 1 is a schematic view of the construction of the pipe processing apparatus with a device for effecting the adhesive application of closures.

Insulating pipes are shaped according to processes as described, for example, in German Pat. No. 2,532,406, from flat foam sheets, for example, from crosslinked polyolefin foam materials with the use of heat. The thus-shaped insulating pipe or tubular element 13, which is not yet closed, leaves the shaping tube 6 and is fed by means of a conveyor belt 9 to the device 30 for the application of a slide fastener 3 with two closure strips 3a, 3b to the slotted pipe 13. The conveyor belt 9 is drawn about rollers 28, on the upper side the roll 29 is provided for the taking off of the pipe 13.

Device 30 comprises a stand 1 from which the closure 3 made up of the closure strips 3a, 3b (see FIG. 4) is unreeled from an inserted reel 2. The closure 3 in the form of, for example, a slide fastener of PE, first runs through a braking means 4 with which a uniform tensile force, adjustable by way of a setting spring 5, is produced in the slide fastener. This braking means is required to produce straight pipes. The foam pipe 13 proper will still shrink after its manufacture. This shrinkage is, in part, due to thermal influences since the pipe is not as yet fully cooled throughout and, in part, steams from an elongation due to frictional resistances in the individual apparatus zones, such as shaping tube 6 and inlet funnel 7. By a corresponding elongation of the slide fastener 3, the subsequent change in length of the foam pipe can be compensated for.

It has been found that slip brakes wherein the closure is decelerated by clamping fulfill this task only inadequately. Therefore, a so-called friction wheel brake is utilized wherein the slide fastener 3 is first conducted over a profiled guide roller 8 against which runs a rubber-covered braking roll 10, this braking roller being braked with an adjustable spring 5 and a brake lining. the likewise profiled roller 11 provides an extensive looping of the strip around the braking roller 10 and the guidance of the slide fastener strip 3 toward the inlet into the sliding plate 12.

In the region of the sliding plate 12, the slide fastener 3 is applied to the open foam strip 13, shaped into a pipe. the application is preferably accomplished by hot air welding. For this purpose, heated air, via a blower 14 and a hot air heater 15 and via air conducting nozzles 16, is directed onto the slide fastener and the contacting zone of the foam pipe. To ensure continuous manufacture, the sliding plate 12 is kept cold by way of cooling ducts 17 with the use of a cooling medium (water, air, etc.), since otherwise the sliding plate would heat up above the high temperature (about 300°–600° C.) of the welding air and would thus lead to sticking of the foam pipe. In order to produce round pipes, the sliding plate 12 is equipped with a rounded portion 18 corresponding approximately to the outer diameter of the insulating pipe. The sliding plate furthermore comprises a guide groove 19 starting with the inlet opening 20 for the closure strip 3. The guide groove 19 is arranged eccentrically with respect to the joints 21 of the foam pipe 13 namely in such a way that the portion of the closure strip 3b of the slide fastener that is positioned at the bottom, i.e. below a portion of strip 3a is in flush contact with the longitudinal edge 21 of the pipe. In order to guide the edges 21 of the foam pipe 13 in the zone of the sliding plate 12, a baffle 24 extends into a slot 23 of the sliding plate 12. This baffle 24 serves for aligning the edges 21 of the foam pipe 13 with respect to the slide fastener 3. This baffle 24 is likewise cooled for the aforementioned reasons, to ensure continuous manufacture. Therefore, the baffle, just as the sliding plate 12, is made of a readily heat conducting material (copper, brass or aluminum, etc.). For this purpose, the baffle 24 carries at its lower edge a cooling tube system with feed means 26 and return means 27 for the cooling medium. The surface of the outer tube 26 of this cooling means simultaneously serves as an abutment for the foam pipe 13 to produce the contact pressure required for the application of the slide fastener 3. The baffle 24 with the cooling system 26, 27 is attached to a mounting, not shown, so that it is vertically adjustable with regard to the wall thickness of the foam pipe 13. This makes it possible to adjust the contact pressure applied to the foam pipe. In the zone of sliding plate 12 and of rollers 28 the pipe on both sides is guided by guiding plates 25.

The apparatus for applying the slide fasteners is built as a compact unit and can be exchanged with very little expense for modifications against another apparatus of the pipe processing plant. In order to start up the apparatus and in case of a disturbance, the hot air producer with the air conducting nozzles can be moved, for example, laterally by way of pneumatic cylinders along guide rods. The slide fastener is bonded to the foam pipe preferably, as described, by hot air welding. Instead of hot air welding, it would also be possible to utilize flame welding with a flame laminating installation. It is also possible by means of the same process to apply closure strips coated with heat sealing adhesives to insulating pipes. The welding temperatures can be infinitely varied in correspondence with the material characteristics of the closure strips and/or of the heat sealing adhesive, and in accordance with the manufacturing speed.

We claim:

1. A process for the continuous manufacture of a pipe that has a slot extending in the longitudinal direction of the pipe and a releasable closure means for closing the slot, and that is made from a sheet of a thermoplastic foam material, which comprises shaping the sheet in the heated thermoelastic and/or thermoplastic state at right angles to its longitudinal direction into form of a pipe, having a longitudinally extending open slot, and bonding strips of the closure means comprised of a thermoplastic synthetic resin, to the mutually facing longitudinal edges of the sheet that define the slot by welding, heat sealing, cementing, or the like bonding procedure; the closure means, prior to being bonded to the shaped, still heated foam pipe, being elongated by the effect of a tensile force to the same extent as the foam pipe shrinks during cooling after application of the closure means, so that the joined together closure means and the foam pipe shrink by the same extent.

2. A process according to claim 1, wherein the closure means is elongated by means of a friction wheel brake with an adjustable setting spring regulating the tensile force to be applied, prior to bonding to the foam pipe.

3. A process according to one of claims 1 or 2, wherein the closure means is bonded thermally by applying hot air to the not yet closed foam sheet shaped into a slotted pipe, and the pipe is guided under cooling on its outside and inside in the zone of the longitudinal edges.

4. An apparatus for producing a thermoplastic foam pipe having a slot extending in a longitudinal direction and having releasable closure means for closing said slot, which comprises a revolving conveyor belt for continuously feeding a foam sheet through a closure applying device, said device comprising an inlet funnel for guiding the foam sheet in the form of a slotted pipe, means for closing the slot and a feed means for supplying a closure means to the edges of said slot; friction wheel brake with a braking roller having an adjustable friction resistance for effecting the elongation of the closure means; a cooled guide means for guiding the pipe in a zone subjacent to said slot, said guide means being in contact with the inside of the pipe in the zone of the slot; and a cooled sliding plate for contacting the outside of the pipe in the zone of the slot, said plate having a guide groove and an inlet opening for the entry of the closure means and for placing the closure means in position on the longitudinal edges of the pipe defining the slot.

5. An apparatus according to claim 4, wherein the braking roller is followed by a roller that is associated with the braking roller in such a way that the looping angle of the closure means reeled off from the braking roller is, on the braking roller, at least 180°.

6. An apparatus according to claim 4 or 5, wherein the sliding plate is formed with ducts for conducting therethrough a cooling medium.

7. An apparatus according to one of claims 4 or 5, wherein the sliding plate is designed, on its underside in contact with the pipe, with a rounded portion corresponding approximately to the outside curvature of the pipe.

8. An apparatus according to claim 4, wherein a cooled baffle is arranged in the zone of the sliding plate, this baffle extending between the longitudinal edges of the pipe.

9. An apparatus according to claim 8, wherein the cooled guide means provided for the inside of the pipe is attached to the baffle.

10. An apparatus according to claim 9, wherein a hot air generator with blower is provided, and an air conducting nozzle is aligned so that the nozzle is oriented toward the closure means and toward the zone of the pipe to which the closure means is applied and then bonded.

* * * * *